United States Patent
Oga et al.

(10) Patent No.: US 8,563,866 B2
(45) Date of Patent: Oct. 22, 2013

(54) PROTECTOR AND WIRE HARNESS

(75) Inventors: Tatsuya Oga, Kosai (JP); Hidehiro Ichikawa, Kosai (JP); Takeshi Ogue, Kosai (JP)

(73) Assignee: Yazaki Corporation, Tokyo (JP)

( * ) Notice: Subject to any disclaimer, the term of this patent is extended or adjusted under 35 U.S.C. 154(b) by 255 days.

(21) Appl. No.: 12/737,790

(22) PCT Filed: Aug. 11, 2009

(86) PCT No.: PCT/JP2009/064168
§ 371 (c)(1),
(2), (4) Date: Feb. 16, 2011

(87) PCT Pub. No.: WO2010/021270
PCT Pub. Date: Feb. 25, 2010

(65) Prior Publication Data
US 2011/0132638 A1    Jun. 9, 2011

(30) Foreign Application Priority Data

Aug. 19, 2008    (JP) ................. 2008-210282

(51) Int. Cl.
*H01B 7/17*    (2006.01)
(52) U.S. Cl.
USPC ......................................................... 174/135
(58) Field of Classification Search
CPC ........................................................ H01B 7/17
USPC .......................................................... 174/135
See application file for complete search history.

(56) References Cited

U.S. PATENT DOCUMENTS

| 7,399,922 B2 * | 7/2008 | Oga et al. ............. 174/72 A |
| 2005/0178576 A1 * | 8/2005 | Saka et al. ............. 174/66 |

FOREIGN PATENT DOCUMENTS

| DE | 100-32308 A1 | 1/2002 |
| JP | 56-136429 | 10/1981 |
| JP | 59-18823 A | 5/1984 |
| JP | 06276643 | 9/1994 |
| JP | 11034763 A * | 2/1999 |
| JP | 11-136831 A | 5/1999 |
| JP | 2002-225648 A | 8/2002 |
| JP | 2002225648 A * | 8/2002 |
| JP | 2004-224156 A | 8/2004 |

(Continued)

OTHER PUBLICATIONS

International Search Report dated Oct. 6, 2009, issued for PCT/JP2009/064168.

(Continued)

*Primary Examiner* — Timoty Thompson
*Assistant Examiner* — Charles Pizzuto
(74) *Attorney, Agent, or Firm* — Edwards Wildman Palmer LLP (57) ABSTRACT

This invention is to provide a protector capable of discharging water into an outside and a wire harness including the protector.

A drainage hole is formed as a portion so as to discharge water collecting in an electrical wire receiving portion into an outside. The drainage hole is formed so as to penetrate through the electrical wire receiving portion and toward the rear of a vehicle. Further, the drainage hole is formed so as to gradually slope from the electrical wire receiving portion toward the ground surface. The drainage hole is a through hole which is formed at a position near an end portion of a protection member for the vehicle interior. The drainage hole is formed and located in a portion of the wire harness which is the closest to the ground surface.

18 Claims, 7 Drawing Sheets

(56) References Cited

FOREIGN PATENT DOCUMENTS

| JP | 2004224156 A | * | 8/2004 |
| JP | 2004-268803 A | | 9/2004 |
| JP | 2004268803 A | * | 9/2004 |
| JP | 2006-180625 A | | 7/2006 |

OTHER PUBLICATIONS

Chinese Office Action issued on May 21, 2013 for corresponding Chinese Patent Applicatio No. 200980138839.9.

* cited by examiner

PROTECTOR AND WIRE HARNESS

TECHNICAL FIELD

The present invention relates to a protector extended and provided in an adjacent corrugated tube and a wire harness including the protector.

BACK GROUND ART

A wire harness described in the following patent document 1 includes three high-voltage electrical wires and three metallic protection pipes and consists of them. Each metallic protection pipe receives and protects each high-voltage electrical wire. The high-voltage electrical wire is provided as connecting a motor mounted on a front side of vehicle to an inverter mounted on a middle side or back side of the vehicle.

The wire harness is arranged through the body under floor which is an outside of a body frame. For this reason, the metallic protection pipe is formed as so to protect the high-voltage electrical wire from splash of stone or water. The metallic protection pipe has stiffness for protecting the high-voltage electrical wire from splash of stone or water and for preventing flexible of the high-voltage electrical wire. Moreover, the metallic protection pipe has electromagnetic shield function because it is made from metal.

The wire harness is made by inserting the high-voltage electrical wire into the metallic protection pipe of straight condition three times and by bending the metallic protection pipe along arrangement route of the wire harness in the body under floor. After the wire harness is produced as mentioned above in a manufacturer factory of harness, the wire harness is transferred to an assembly factory of vehicle and assembled into predefined position of a vehicle. Thereby, arrangement of the wire harness is finished.

PRIOR ART DOCUMENT

Patent Document

Patent document 1: Japanese patent publication number 2004-224156

DISCLOSURE OF THE INVENTION

Problem to be Solved by the Invention

Since vehicle is used to under various environmental conditions, the above-mentioned prior art has the following problems. That is, when condensation occurs in the metallic protection pipe, water of the condensation is moved and collected in one place. As a result, there is a puddle in the collected place. Thereby, if a high-voltage electrical wire is soaked in the puddle, the high-voltage electrical wire may be damaged. So, the above-mentioned prior art has problems of water.

In addition, as the above-mentioned prior art, when the wire harness is transferred, it is required that enough space is maintained in each wire harness because the metallic protection pipes deform by touching each other. This is a problem. Further, since the metallic protection pipe is produced by bending work three-dimensionally, stereoscopic space is required. This is a problem. That is, the above-mentioned prior art also has problem of space.

The present invention has been made in order to solve the above-mentioned problems, and an object of the present invention is to provide a protector which can discharge water into the outside and a wire harness including the protector.

The present invention further is to provide a wire harness which can discharge water and reduce a transportation space.

Problem to be Solved by the Invention

According to a protector of the invention described in claim 1 so as to solve the above problem, the protector holding an end portion of electrical wire or bundle of electrical wire in a place between opposing corrugated tubes each other for receiving the electrical wire or the bundle thereof, the protector comprises a pair of tube holding portions which hold the end portion of the corrugated tube each other; and a electrical wire receiving portion which receives the electrical wire or the bundle of the electrical wire located between the pair of the tube holding portions and exposed from the end portion. Holding object of the protector is corrugated tube without slit and a protector fixed object position is a body under floor of a vehicle. A drainage hole for discharging water to an outside is formed in the electrical wire receiving portion and penetrates therethrough, and is formed thereof, and a penetration direction of the drainage hole is set toward a rear of the vehicle.

According to the present invention having the above described characteristic, the protector having configuration holding a corrugated tube which can be easy to bend and reduce transportation space of the wire harness is provided. Additionally, although condensation occurs in the corrugated tube, the protector is possible to discharge the water into outside. The drainage hole is a through hole which is formed toward a rear of the vehicle. Thereby, it is possible to keep out water when the vehicle is moving.

The protector of the present invention described in claim 2, in the protector described in claim 1, is characterized that the drainage hole is formed into a shape which gradually slopes from the electrical wire receiving portion toward the ground surface.

According to the present invention having the above described characteristic, it is possible to discharge water into an outside more natural.

The wire harness of the present invention described in claim 3 in order to solve the above problem has a protector having the drainage hole described in claim 1 or 2, a corrugated tube held in the protector and formed into a shape without slit, and an electrical wire or a bundle thereof which is received in the corrugated tube. Further, a body under floor of a vehicle is included at an arranged object position.

According to the present invention having the above described characteristic, the wire harness having the protector which can discharge water internally generated into the outside and can keep out water when the vehicle is moving is provided. Furthermore, according to the present invention, the wire harness having the corrugated tube which can be easy to bend and reduce transportation space is provided.

The wire harness of the present invention described in claim 4, in the wire harness described in claim 3, it is characterized that the corrugated tube is a plastic flat-corrugated tube having insulation performance. Cross-section thereof is formed into a noncircular-shaped.

According to the present invention having such the characteristics, the corrugated tube is a flat type. Thereby, it is possible to provide the wire harness which is short in height lower than a round type. Further, the corrugated tube is constructed of plastics material. For this reason, it is possible to reduce weight compared with metallic material. By reducing the weight, it is possible to be easy to deal with the wire harness. In addition, according to the present invention, the corrugated tube has insulation performance. Thereby, for example, high current does not pass through the corrugated tube. As a result, it is possible to improve safety thereof.

The wire harness of the present invention described in claim 5, it is characterized that the drainage hole is arranged at a position which is closest to the ground surface when arranging in the body under floor.

According to the present invention having the above characteristic, water which occur in the inside can be discharged into the outside more natural.

The wire harness of the present invention described in claim 6, it is characterized that the protector is arranged at a position at which an arrangement direction of the electrical wire or the bundle of electrical wire is changed.

According to the present invention having the above characteristic, the wire harness having the protector is provided. The protector installs a drainage hole in a position which water collects easily. Further, according to the present invention, the wire harness which can decrease load against the corrugated tube is formed.

Effect of the Invention

According to the invention described in claim 1, protector, which can discharge water collected in the corrugated tube into an outside, can be provided.

According to the invention described in claim 2, it is possible to discharge the water into the outside more natural.

According to the invention described in claim 3, it is also possible to discharge the water. In addition, a wire harness which is possible to reduce carrier space can be provided.

According to the invention described in claim 4, a wire harness of low height can be provided.

According to the invention described in claim 5, it is possible to discharge water into the outside more natural.

According to the invention described in claim 6, the wire harness which can discharge easily and decrease load against the corrugated tube is provided.

BRIEF DESCRIPTION OF DRAWINGS

[FIG. 2] A view showing a body under floor protection member and a lean hose.

[FIG. 7] An exemplary view showing process from wire harness manufacturing to vehicle assembly.

DESCRIPTION OF EMBODIMENTS

Figure 1:
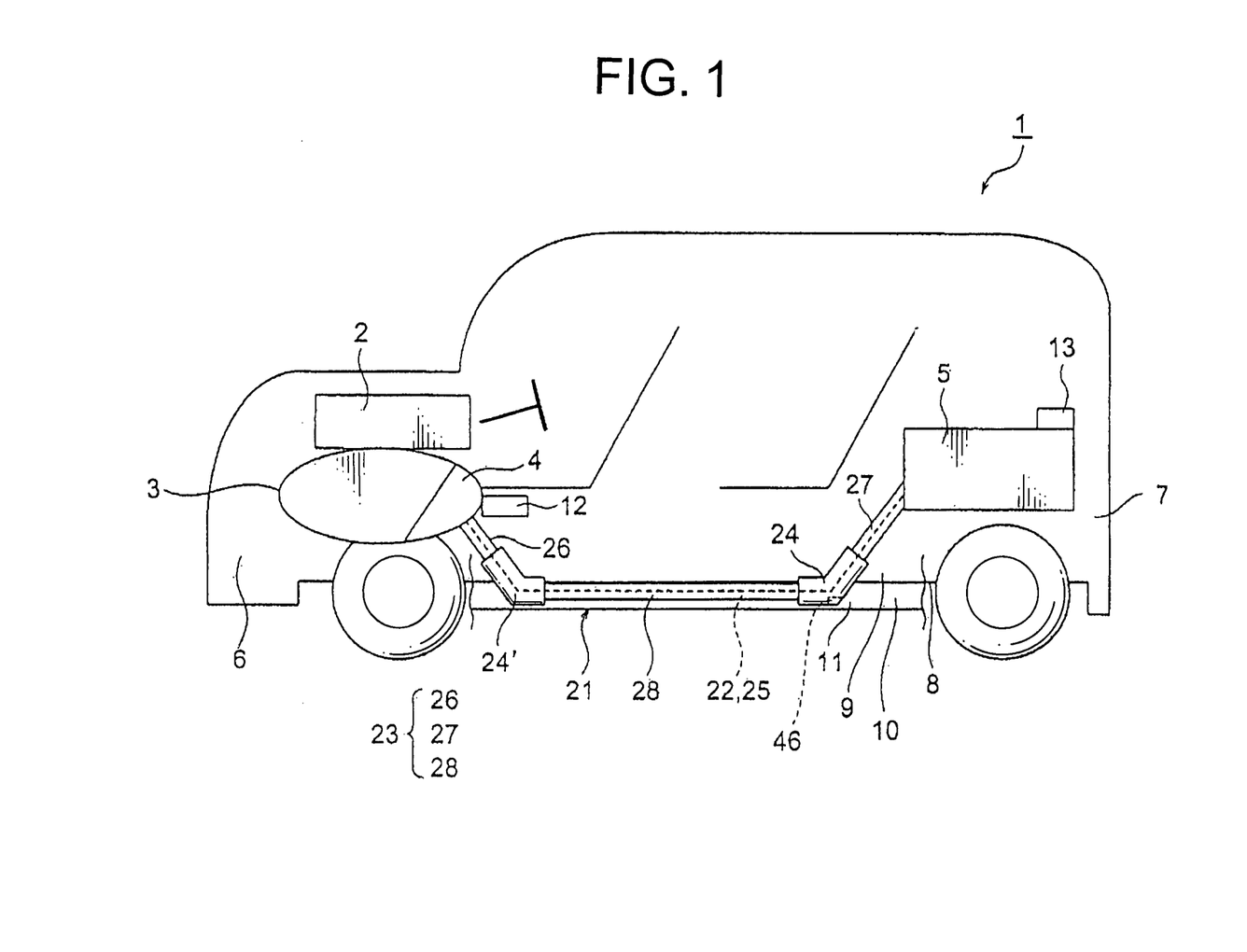
[FIG. 1] An exemplary configuration view showing an embodiment of a protector and a wire harness according to the present invention.
Figure 2A:
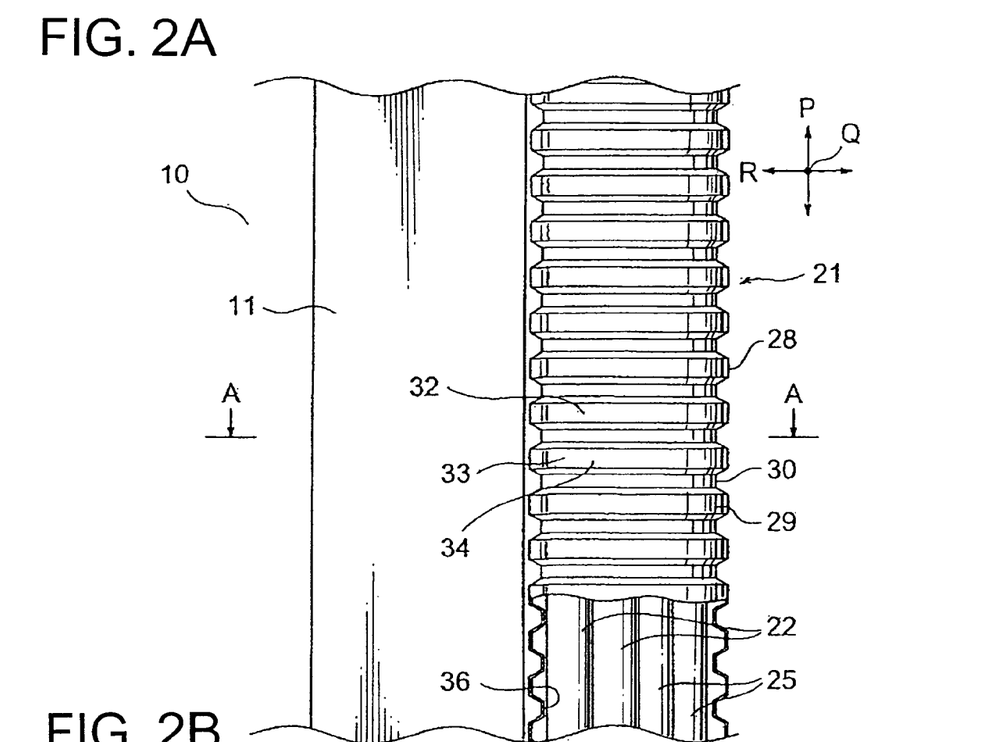
FIG. 2A is an essential enlarged view when seeing a body under floor from the ground.
Figure 2B:
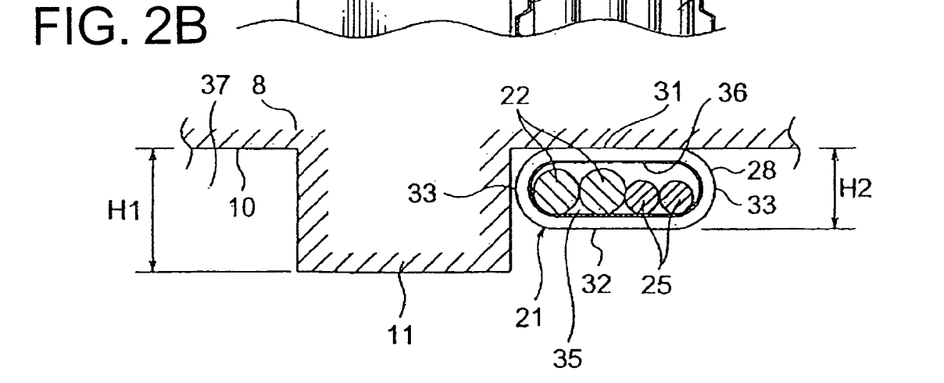
FIG. 2B is a cross-sectional view taken along the line A-A in FIG. 2A.

Hereinafter, the present invention will be explained with reference to FIGS. FIG. 1 is an exemplary configuration view showing an embodiment of a protector and a wire harness of the present invention. Furthermore, FIG. 2 is a view showing a body under floor protection member and a lean hose. FIG. 2A is an essential enlarged view (including part of cross section) when the body under floor is seen from the ground. FIG. 2B is a cross-sectional view taken along the line A-A in FIG. 2A.

Figure 3:
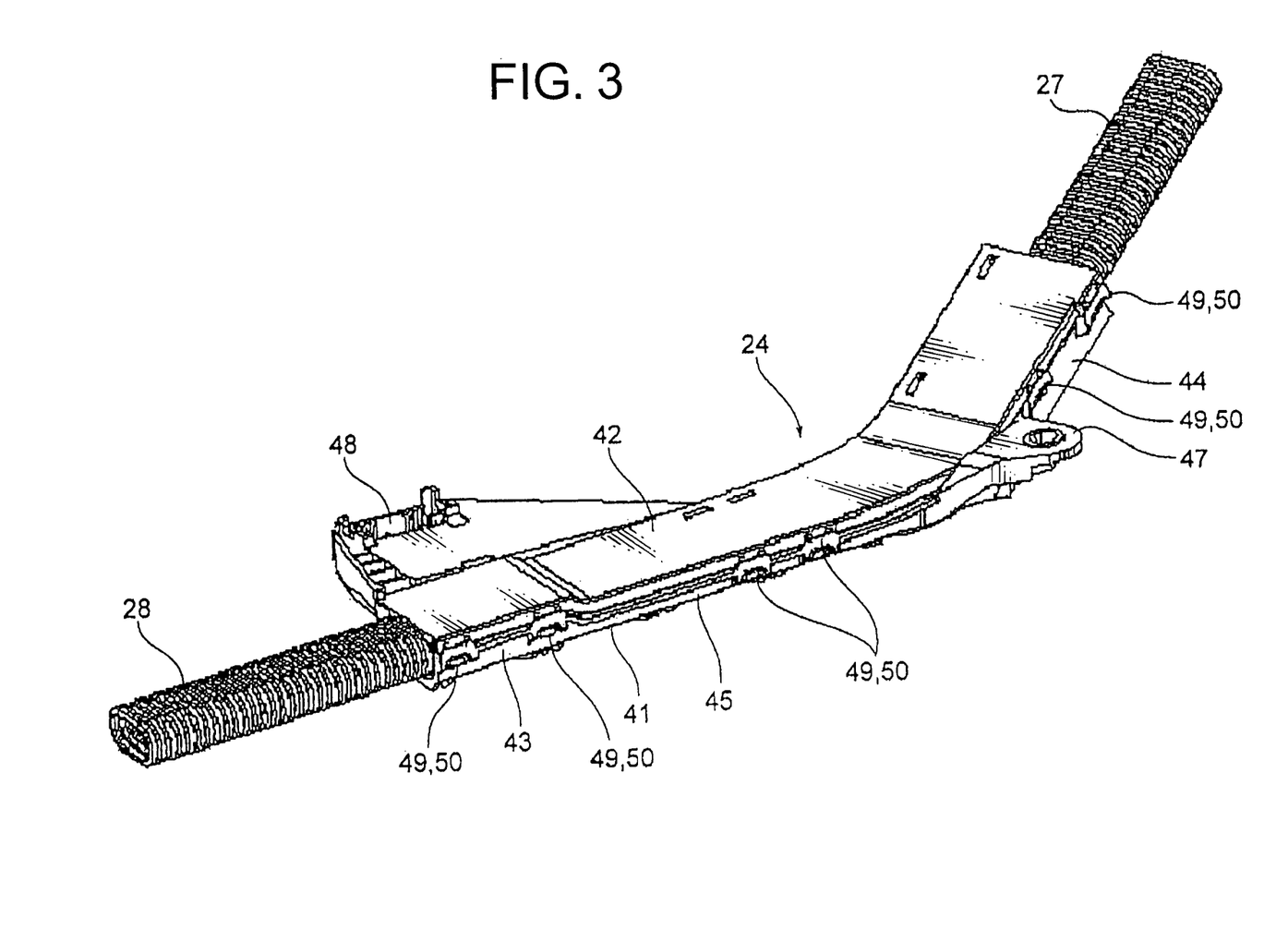
[FIG. 3] A perspective view of a protector according to the present invention.
Figure 4:
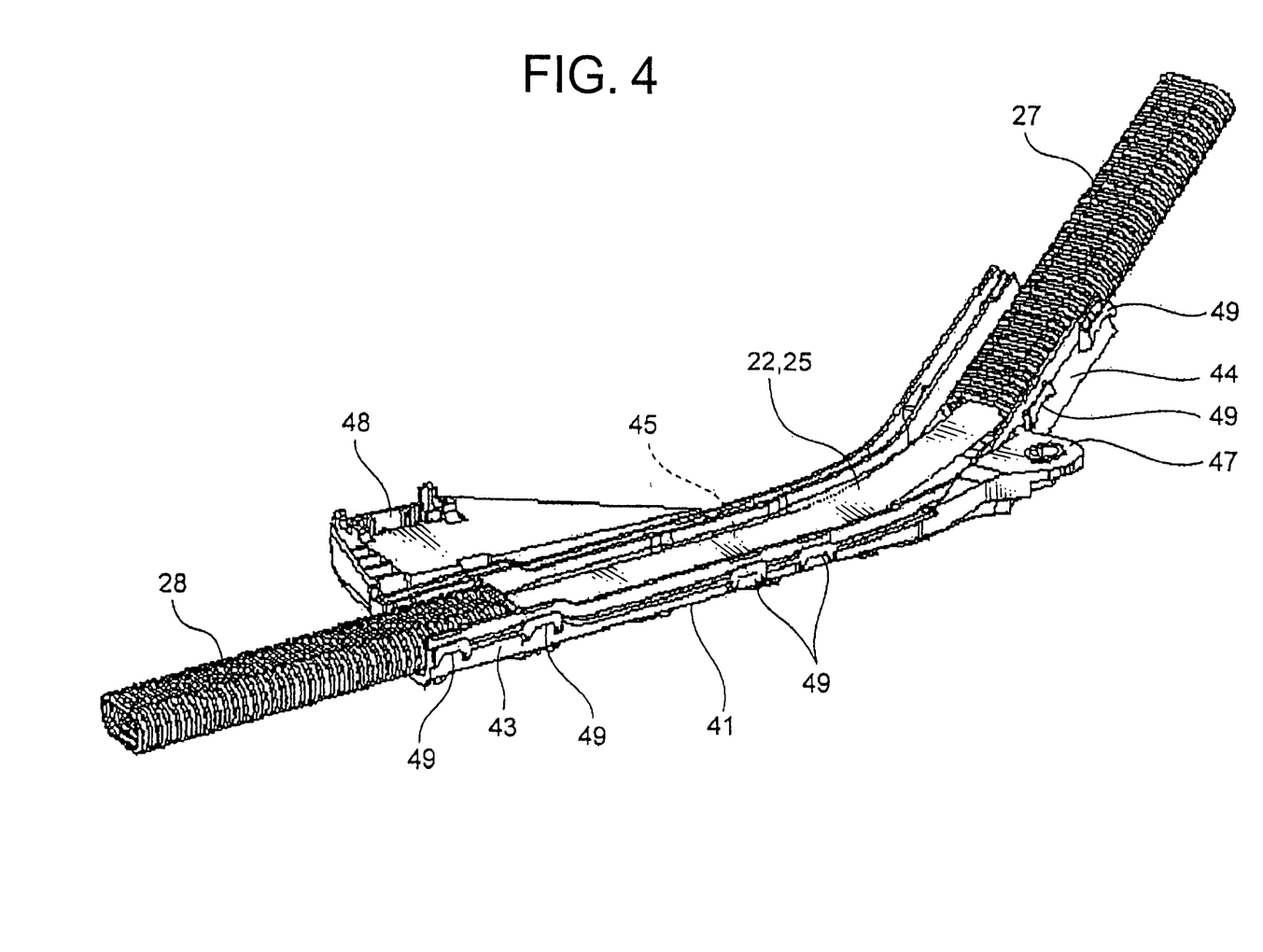
[FIG. 4] A perspective view of a protector body in the protector according to the present invention.
Figure 5:
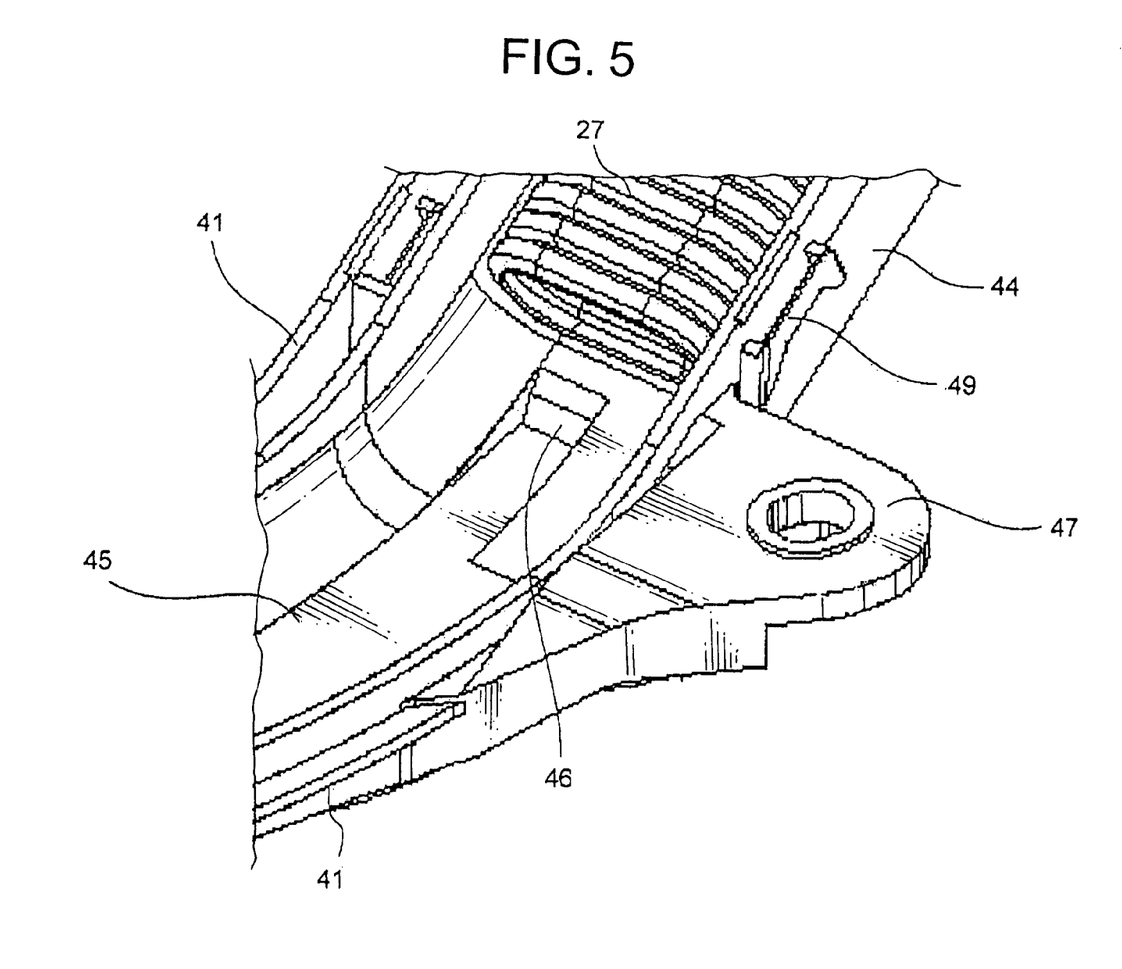
[FIG. 5] A perspective view of a drainage hole seen from inside of the protector body.
Figure 6:
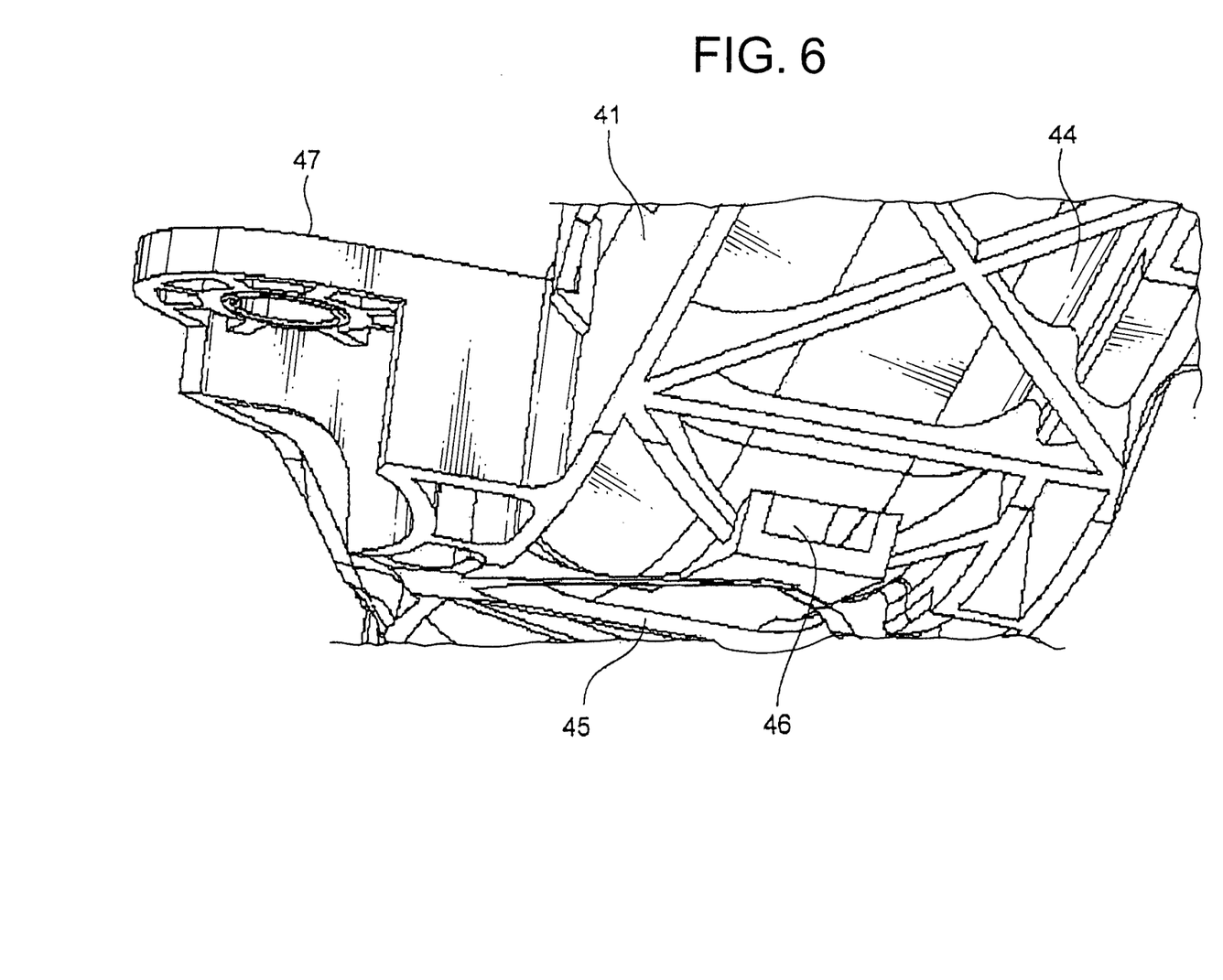
[FIG. 6] A perspective view of a drainage hole seen from outside of the protector body.

Also, FIG. 3 is a perspective view of the protector of the present invention. FIG. 4 is a perspective view of the protector body in the protector of the present invention. FIG. 5 is a perspective view of drainage hole seeing from an inside of the protector body. FIG. 6 is a perspective view of the drainage hole seeing from an outside of the protector body.

Figure 7A:
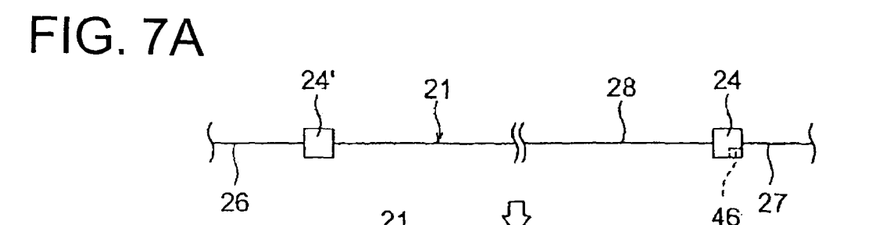
FIG. 7A is a wire harness view after manufacturing.
Figures 7B, 7C:
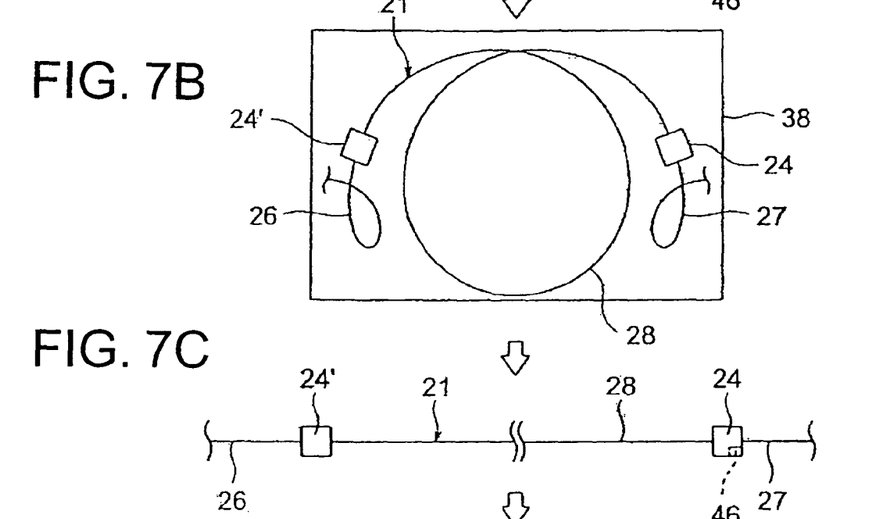
FIG. 7B is a wire harness view showing a state receiving in a general-returnable box and transporting.
FIG. 7C is a wire harness view just before vehicle assembly.
Figure 7D:
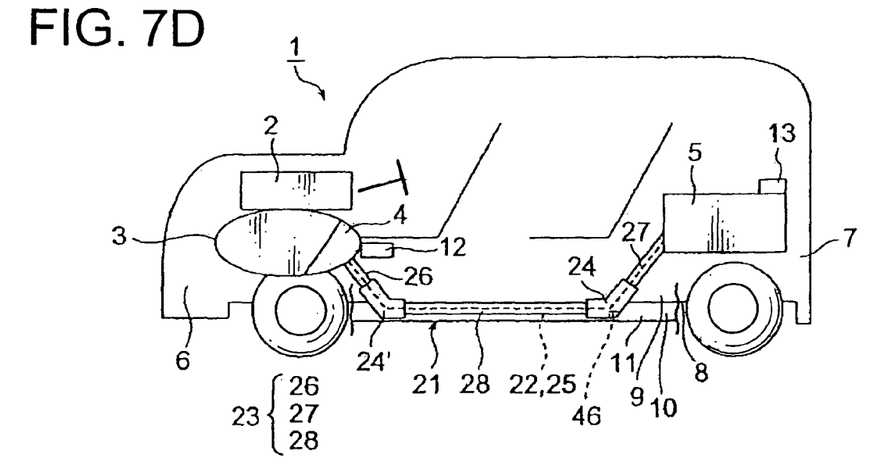
FIG. 7D is a wire harness view after vehicle assembly.

Furthermore, FIG. 7 is an exemplary view showing process from manufacture of the wire harness to vehicle assembly. FIG. 7A is a view of the wire harness immediately after manufacturing. FIG. 7B is a view of the wire harness in a state received in a general-returnable box and transferred. FIG. 7C is a view of the wire harness before assembling the vehicle. FIG. 7D is a view of the wire harness after assembling the vehicle.

The wire harness of an embodiment in the present invention is designed for object mounted on a hybrid vehicle or an electrical vehicle. In what follows, an example of the hybrid vehicle is described (even for electrical vehicle, constitution of the wire harness, configuration thereof, and effect thereof are basically the same).

In FIG. 1, reference sign 1 shows a hybrid auto vehicle. The hybrid auto vehicle 1 is a vehicle which is powered by mixing two power of an engine 2 and a motor 3. In the motor 3, electrical power from a battery 5 through an inverter 4 is supplied. The engine 2, the motor 3 and the inverter 4, in the embodiment, is mounted on a front side of the vehicle interior 6 having front wheels etc. In addition, the battery 5 is mounted on a back side of the vehicle interior having back wheels etc.

Reference sign 8 shows a body frame. In FIGS, an upper side of the body frame 8 shows a body floor 9. Also, a bottom side of the body frame 8 shows a body under floor 10. In the body under floor 10, a lean hose 11 is provided. The lean hose 11 is made with protrusion shape so as to increase the strength of the vehicle in cross-section. The lean hose 11 stretches back and forth in the vehicle, and is formed. Reference sing 12 in the front side of the vehicle interior 6 shows an electrical connection box such as a well-known relay box. Further, reference sign 13 in the back side of the vehicle interior 7 shows a well-known low-pressure battery (position of the low-pressure battery 13 is one example).

In the embodiment, the motor 3 includes a motor and a generator and consists thereof. Also, the inverter 4 includes an inverter and a converter and consists thereof. The inverter 4 is an inverter assembly, in the above inverter, for example air conditioner inverter, inverter for generator and inverter for motor are included. The battery 5 is Ni—NH (Nickel metal hydride) battery or Li-ion (lithium-ion) battery, and is modularized. In addition, it is possible to use an electric storage device such as a capacitor.

Between the inverter 4 and the battery 5 is connected by a wire harness 21 of the present invention.

The wire harness 21 of the present invention has a plurality of high-voltage electrical wires 22, a protection member 23, and protectors 24, 24'. The high-voltage electrical wire 22 electrically connects between the inverter 4 and the battery 5. The protection member 23 protects the plurality of the high-voltage electrical wires 22. The protector 24 is characterized in the present invention, and has function as a fixed member for fixing the vehicle. The protector 24' is formed by excepting a drainage hole described below which is characterized in the present invention from the protector 24.

Furthermore, specifically not limited, in the embodiment, the wire harness 21 has a plurality of public low-voltage electrical wires 25 (In the embodiment, a low-voltage electrical wire 25 is provided so as to arrange a low-voltage battery 13 in the back side of the vehicle interior 7. in the embodiment, the wire harness 21 is modularized).

The wire harness 21 is extended and formed from the front side 6 of the vehicle interior to the back side 7 of the vehicle interior through the body under floor 10. The wire harness 21 passes through the body frame 8. Hereinafter, the above configuration in the wire harness 21 is described.

The above high-voltage electrical wire 22 is well-known power cable, and a circular shape which becomes at a prescribed diameter is used in cross-section. The high-voltage electrical wire 22 is thicker than the above described low-voltage electrical wire 25. A conductor, which is located in the center of the high-voltage electrical wire 22, is made of copper, copper alloy or aluminum. The two high-voltage electrical wires 22 are provided in the embodiment. In these each terminal, a connector (not shown) having a terminal for connecting equipment is provided. Besides, the high-voltage electrical wire 22 may have shield function including braided wire and so on (regarding to the shield function, braided wire which covers the plurality of high-voltage electrical wires 22 in one lump may be provided).

The above described low-voltage electrical wire 25 is protected by the protection member 23 with the high-voltage electrical wire 22. One end of the low-voltage electrical wire 25 is connected to the above electric connection wire 12, the other end thereof is connected to the low-voltage battery 13.

The protection member 23 which protects the plurality of high-voltage electrical wires 22 and the plurality of low-voltage electrical wires 25 is provided with each part of different types. For more detail, the protection member 23 has the protection members for vehicle interior 26, 27 and the body under floor protection member 28 and is provided therewith. In addition, function of the protection member 23 has the above protectors 24, 24' in the embodiment.

The vehicle interior protection members 26, 27 (corresponding to corrugated tube described in claim) is located at the vehicle interior in the body floor 9 side, and constructed of plastics material having insulation performance. Especially not limited, the same body under floor protection member 28 described below is used (if there is a corrugated tube which can protect the high-voltage electrical wire 22 and so on inside vehicle, configuration of the vehicle interior protection members 26, 27 is specifically not limited). The vehicle interior protection member 26 is arranged in the vehicle interior front side 6. Furthermore, the vehicle interior protection member 27 is arranged in the vehicle interior back side 7.

In FIG. 1 and FIG. 2, the above body under floor protection member 28 (corresponding to corrugated tube described in claim) is a plastic flat-corrugated tube having insulation performance formed into noncircular-shaped (herein, oval shaped). Moreover, the body under floor protection member 28 is formed into concertinas along an axial direction of a member (refer to arrow P direction in FIG. 2). More specifically, a protrusion portion 29 and a recess portion 30 are alternately consecutive in a circumferential direction of independent member. In the body under floor protection member 28 such the above shapes, a bending direction is regulated. That is, it is easy to be bent in a Q direction perpendicular to a plane of paper in FIG. 2, and difficult to be bent in an arrow R direction (member width direction).

More specifically about the shape, the body under floor protection member 28 has a pair of plane surfaces facing each other and a pair of curved surfaces connecting the plane surfaces, and is formed therewith (cross-sectional shape is a ellipsoidal shape. As well, the cross-sectional shape thereof is one example). In particular, the body under floor protection member 28 has a under floor setting surface 31, a ground opposing surface 32, and a pair of curved surfaces 33. Cross-sectional shape thereof is formed into a oval shape. In the protrusion portion 29, a top surface 34 is formed, and consists of the under floor setting surface 31, the ground opposing surface 32 and the curved surface 33.

A reason forming into such the above shape is so as to lower a height H2 of the body under floor protection member 28 more than a height H1 of the lean hose 11 (range in height H1 from the body under floor 10 to a tip surface of protrusion portion of the lean hose 11). That is, the body under floor protection member 28 is formed so as to lower than the lean hose 11. Further, as the above reason, in order to suit the high-voltage electrical wire 22 and the low-voltage electrical wire 25 to a state arranged in a lateral line, interior space 35 is formed. The interior space 35 is formed so that space which occurs between the high-voltage electrical wire 22 and member inner surface 36 is small as much as possible (in this regard, the space is controlled within a scope which does not affect production). The body under floor protection member 28 is formed into shape hiding into a dead space 37 which caused by the lean hose 11 when it is placing next to the lean hose 11.

The body under floor protection member 28 is formed into a seamless shape without slit along an axis direction of the member (refer to arrow P direction in FIG. 2). In the body under floor protection member 28, the high-voltage electrical wire 22 and the low-voltage electrical wire 25 are inserted each other from this opening toward the other opening.

In the embodiment, as a reason avoiding the use of corrugated tube including slit which is commonly known, it is possible to frequently occur ingress of water through a slit by splash of water when the vehicle is moving. In addition, when the corrugated tube including slit is bent, the slit may be opened. As a result, it may be possible to effect by splash of stone except splash of water when the vehicle is moving or mounting of the wire harness may be affected.

In FIG. 1, the above protector 24 is provided as a type of multiple fixing members so as to fix the wire harness 21 in the vehicle, and as a characterizing portion of the present invention. The protector 24 is constructed of plastics material including insulating performance, and is formed so that the vehicle interior protection member 27 can be connected with the body under floor protection member 28. In other words, the protector 24 lies astride an end portion of the vehicle interior protection member 27 and an end portion of the body under floor protection member 28 and is formed. Further, the above protector 24' is formed so that the vehicle interior protection member 26 can be connected with the body under floor protection member 28.

Specific configuration of the protector 24 will be described with reference to FIG. 3 to FIG. 6.

In FIG. 3, the protector 24 has a protector body 41 and a protector cover 42 which cover and fit the protector body 41. The protector 24 is arranged at position at which an arrangement direction is changed in the wire harness 21 (shown in FIG. 1). The protector 24 has a portion along the body under floor 10 (shown in FIG. 1) and a portion bending and turning up. The protector body 41 is arranged at the ground side, and the protector cover 42 is arranged at the body under floor 10 side.

In FIG. 3 and FIG. 4, the protector body 41 has a tube holding portion 43 which hold an end portion of the body under floor protection member 28, a tube holding 44 which hold an end portion of the vehicle interior protection member 27, a electrical wire receiving portion 45, a drainage hole 46 which is formed in the electrical wire receiving portion 45, a screw stop fixing portion 47 which screws in the body frame 8 (shown in FIG. 1), a locking portion 48 which is locked at the body frame 8 and a plurality of body side fitting portions 49 formed against the protector cover 42. The electrical wire receiving portion 45 is located between the tube holding portion 43 and the tub holding portion 44 and receives the plurality of high-voltage electrical wires 22 and the low-voltage electrical wires 25 exposed from the above end portion. The electrical wire receiving portion 45 is located between the tube holding portion 43 and the tube holding portion 44, and receives the plurality of the high-voltage electrical wires 22 and the plurality of the low-voltage electrical wires 25 which are exposed from the above each end portion.

In the tube holding portion 43, a convex portion (not shown) which catches the recess portion 30 of the body under floor protection member 28 (shown in FIG. 2) and retains therein. The convex portion is formed in the tube holding portion.

In FIG. 5 and FIG. 6, a drainage hole 46 is formed as a portion for discharging water, which is collected into the electrical wire receiving portion 45, into an outside. The drainage hole 46 is formed to penetrate through the electrical wire receiving portion 45, and to pass behind the vehicle. Moreover, the drainage hole 46 is formed to gradually slope from the electrical wire receiving portion 45 in the ground side. The drainage hole 46 is formed into a shape which is difficult to break by external force.

In the embodiment, the drainage hole 46 penetrates with a position near an end portion of the vehicle interior protection member 27 and is formed (especially not limiting, but condensation which occurs in the vehicle interior protection member 27 can be preferentially discharged). The drainage hole 46 is arranged at a position of the nearest ground (lowermost position) in the wire harness 21.

The drainage hole 46, for example, penetrates with size which can discharge water collected by condensation and is formed (it is formed into a relatively small through hole). The drainage hole 46 is able to keep out water while the vehicle is moving by an above penetrating direction.

In FIG. 3, the protector cover 42 is a plane member for holding end portions of the body under floor protection member 28 and of vehicle interior protection member 27 which are received in the protector body 41 without shaking, and for fitting in the protector body 41. Furthermore, the protector cover 42 has a cover side fitting portion 50 which fit each other against a plurality of body side fitting portions 49 in the protector body 41.

Next, from manufacture of the wire harness 21 to assembly of the vehicle is explained with reference to FIG. 7.

In FIG. 7A, the protection member includes the vehicle interior protection members 26, 27 and the body under floor protection member 28. The protectors 24, 24' are installed at a prescribed position of the protection member, and manufacture of the wire harness 21 of the present invention is completed.

The manufactured wire harness 21 is bent at positions of the body under floor protection member 28 or vehicle interior protection members 26, 27, and rounded as shown in FIG. 7B. Then, the wire harness 21 is received in a returnable box 38. The wire harness 21 which is received in the returnable box 38 is transferred to an assembly factory of auto manufacturer by a carrying vehicle. In the assembly factory, the wire harness 21 is removed from the returnable box 38 before mounting on the vehicle (shown in FIG. 7C). And then, when the wire harness 21 is mounted on a predetermined position of the vehicle, the mounting is finished.

Therefore, as explaining reference to FIG. 1 to FIG. 7, according to the protector 24 of the present invention, the protector 24 can discharge water occurred in the corrugated tube of the vehicle interior protection member into an outside through the drainage hole 46. Further, according to the wire harness 21, the wire harness 21 can discharge water and reduce carrier space.

The present invention is not limited thereto and includes any modification and alteration within the scope of the present invention.

In the above-mentioned explanation, the protector 24' is configuration except the drainage hole 46 characterized in the present invention, but it is not limited. That is, the drainage hole for discharging condensation water, which is occurred in the protection member for the vehicle interior 26, to an outside may be formed in the same manner (with the same features as the above drainage hole 46).

REFERENCE SIGNS LIST 1 hybrid auto vehicle
2 engine
3 motor
4 inverter
5 battery
6 vehicle interior front side
7 vehicle interior back side
8 body frame
9 body floor
10 body under floor
11 lean hose
12 electric connection box
13 low-pressure battery
21 wire harness
22 high-voltage electrical wire (electrical wire)
23 protection member
24, 24' protector
25 low-voltage electrical wire (electrical wire)
26, 27 vehicle interior protection member (corrugated tube)
28 body under floor protection member (corrugated tube)
29 protrusion portion
30 recess portion
31 under floor setting surface
32 ground opposing surface
33 curved surface
34 top surface
35 interior space
36 member inner surface
37 dead space
38 returnable box
41 protector body
42 protector cover
43, 44 tube holding portion
45 electrical wire receiving portion
46 drainage hole
47 screw stop fixing portion
48 locking portion
49 body side fitting portion
50 cover side fitting portion

The invention claimed is:

1. A protector holding end portions of opposing corrugated tubes receiving an electrical wire or a bundle of electrical wires thereof, the protector comprising:
   a pair of tube holding portions which hold the end portions of the corrugated tubes; and
   an electrical wire receiving portion
      which receives the electrical wire or the bundle of the electrical wires exposed from the end portions of the corrugated tubes and
      which formed between the pair of the tube holding portions,
   wherein the corrugated tubes are without slit and the protector is fixed on a vehicle underfloor,
   wherein a drainage hole for discharging water is formed at the electrical wire receiving portion and penetrates therethrough, and a penetration direction of the drainage hole is set toward a rear of the vehicle.

2. The protector as claimed in claim 1, wherein the drainage hole is formed so as to gradually slope from the electrical wire receiving portion toward the ground.

3. A wire harness comprising:
   a protector having the drainage hole described in claim 1;
   a corrugated tube held in the protector and formed into a shape without slit; and
   an electrical wire or a bundle thereof which is received in the corrugated tube,
   wherein a body under floor of a vehicle is included at a arranged object position.

4. The wire harness as claimed in claim 3, wherein the corrugated tube is a plastic flat-corrugated tube having insulation performance, and a cross-section shape thereof is formed into a noncircular- shaped.

5. The wire harness as claimed in claim 3, wherein the drainage hole is arranged with a position which is closest to the ground when arranging at the body under floor.

6. The wire harness as claimed in claim 3, wherein the protector is arranged at a position with which an arrangement direction of the electrical wire or the bundle of the electrical wire is changed.

7. A wire harness comprising:
   a protector having the drainage hole described in claim 2;
   a corrugated tube held in the protector and formed into a shape without slit; and
   an electrical wire or a bundle thereof which is received in the corrugated tube,
   wherein a body under floor of a vehicle is included at a arranged object position.

8. The wire harness as claimed in claim 7, wherein the corrugated tube is a plastic flat-corrugated tube having insulation performance, and a cross-section shape thereof is formed into a noncircular- shaped.

9. The wire harness as claimed in claim 4, wherein the drainage hole is arranged with a position which is closest to the ground when arranging at the body under floor.

10. The wire harness as claimed in claim 7, wherein the drainage hole is arranged with a position which is closest to the ground when arranging at the body under floor.

11. The wire harness as claimed in claim 8, wherein the drainage hole is arranged with a position which is closest to the ground when arranging at the body under floor.

12. The wire harness as claimed in claim 4, wherein the protector is arranged at a position with which an arrangement direction of the electrical wire or the bundle of the electrical wire is changed.

13. The wire harness as claimed in claim 5, wherein the protector is arranged at a position with which an arrangement direction of the electrical wire or the bundle of the electrical wire is changed.

14. The wire harness as claimed in claim 7, wherein the protector is arranged at a position with which an arrangement direction of the electrical wire or the bundle of the electrical wire is changed.

15. The wire harness as claimed in claim 8, wherein the protector is arranged at a position with which an arrangement direction of the electrical wire or the bundle of the electrical wire is changed.

16. The wire harness as claimed in claim 10, wherein the protector is arranged at a position with which an arrangement direction of the electrical wire or the bundle of the electrical wire is changed.

17. The wire harness as claimed in claim 11, wherein the protector is arranged at a position with which an arrangement direction of the electrical wire or the bundle of the electrical wire is changed.

18. The protector as claimed in claim 1, wherein the drainage hole is formed by three surfaces.

* * * * *